(12) United States Patent
Chen-Iun-Tai et al.

(10) Patent No.: US 11,220,041 B2
(45) Date of Patent: Jan. 11, 2022

(54) 3-D PRINTING AT INCLINED ANGLES

(71) Applicants: Anna Chen-Iun-Tai, Everett, MA (US); Sergey Nefedov, Lytkarino (RU)

(72) Inventors: Anna Chen-Iun-Tai, Everett, MA (US); Sergey Nefedov, Lytkarino (RU)

( * ) Notice: Subject to any disclaimer, the term of this patent is extended or adjusted under 35 U.S.C. 154(b) by 239 days.

(21) Appl. No.: 16/535,307

(22) Filed: Aug. 8, 2019

(65) Prior Publication Data

US 2020/0047400 A1 Feb. 13, 2020

Related U.S. Application Data

(60) Provisional application No. 62/715,961, filed on Aug. 8, 2018.

(51) Int. Cl.
| | |
|---|---|
| *B29C 64/106* | (2017.01) |
| *B29C 64/209* | (2017.01) |
| *B33Y 10/00* | (2015.01) |
| *B28B 1/00* | (2006.01) |
| *E04G 21/04* | (2006.01) |
| *B33Y 30/00* | (2015.01) |

(52) U.S. Cl.
CPC ............ *B29C 64/106* (2017.08); *B28B 1/001* (2013.01); *B29C 64/209* (2017.08); *B33Y 10/00* (2014.12); *B33Y 30/00* (2014.12); *E04G 21/04* (2013.01)

(58) Field of Classification Search
CPC .. B28B 1/001; B28B 1/10; B28B 1/14; B28B 1/16; B29C 64/106; E04G 21/04; E04B 1/3505
See application file for complete search history.

(56) References Cited

U.S. PATENT DOCUMENTS

| | | | | |
|---|---|---|---|---|
| 9,914,169 | B2* | 3/2018 | Ederer | ............... B22F 3/105 |
| 10,093,065 | B2* | 10/2018 | Ederer | ............... B29C 64/165 |
| 10,220,567 | B2* | 3/2019 | Gunther | ............ B29C 64/245 |
| 2015/0290881 | A1* | 10/2015 | Ederer | ............... B29C 64/357 |
| | | | | 264/109 |
| 2018/0319076 | A1* | 11/2018 | Hikmet | ............... B33Y 40/00 |

* cited by examiner

*Primary Examiner* — Mary Lynn F Theisen
(74) *Attorney, Agent, or Firm* — Nadya Reingand; Yan Hankin

(57) ABSTRACT

The invention comprises methods, systems, and devices for angular printing of slab-like inclined portions. Each printed portion overlaps the immediately preceding portion and in combination, the portions form a horizontal structure, such as a roof, floor, a formation of coupled slabs, and others. The horizontal structure may be designed based on desired shape and also based on the setting properties of the printing material. The inclined portions are strong enough to withstand the weight of the structure, so long as guidelines are followed for the required length of inclined portions based on the setting properties of the printing material. The strength of the resulting structure is maximized via the inclined structure making up each layer.

19 Claims, 19 Drawing Sheets

3-D PRINTING AT INCLINED ANGLES

CROSS-REFERENCE TO RELATED APPLICATIONS

This patent application claims priority to U.S. Provisional Patent No. 62/715,961, all of which is incorporated herein by reference.

FIELD OF THE INVENTION

This invention relates to 3D printing of buildings and other structures, and particularly to the printing of horizontal structures.

BACKGROUND OF THE INVENTION 3D printing machines and methods known from the prior art have been much improved over the years in terms of the materials that can be used and the quality features. However, no satisfactory approaches to increasing the volume capacity while maintaining the same quality standards have yet been found. In addition, previous suggestions on ways to increase the process speed were unable to meet the requirements of higher batch production or even mass production, since many different parameters have to be harmonized and coordinated, which has proven to be difficult. Up to now, this problem has remained unsolved, even though manufacturers have been working with 3D printing methods for decades by now.

There has therefore long been the need for a 3D printing method and corresponding printing machines to be available in order to use the advantages of 3D printing while simultaneously meeting the volume and quality requirements of large batches as well as the requirement for a stronger structure created in less time.

The prior art has failed to achieve the following properties: fast printing speed, fast setting time, strength of structure is significantly greater under its own weight than a structure that is printed by any currently known methods.

SUMMARY OF THE INVENTION

The invention consists of methods, systems, and devices for printing horizontal structures such as roofs, floors, slabs, etc. The method comprises printing using any known methods or devices a 3D structure which comprises angles portions which are layers. The layers are positioned one on top of the other along a horizontal axis. The layers may be positioned on an initial layer which spans the depth of the building walls, such that angular printing may be performed on the initial layer. The initial layer may be built and installed, or printed. The layered printing continues to the end wall. Additional pieces may be printed above and atop the layers printing. Additional layered printing may also be performed atop each particular layer of printed portions. Calculations from experiments are provided which show the optimal angles of inclination and printing material properties.

Systems and devices employing the method discussed above and herein are also included in this disclosure.

DETAILED DESCRIPTION OF THE PREFERRED EMBODIMENT

The invention applies to the printing of horizontal structures (e.g., floors, ceilings) via 3D printing technology. The invention comprises methods, systems, and devices for printing individual inclined portions which, in combination, result in the formulation of flat layers, wherein each individual inclined portion is relatively short and/or approximately 1-25 mm thick, more preferably about 10-15 mm thick, depending on the desired thickness of a layer and the printing angle, $z = t/\sin \alpha$. The printed layer itself, although being inclined, does not collapse under its own weight or slide from where it is printed, provided that adhesion properties between portions and/or layers exists and are sufficient, as discussed herein.

The condition of the layer integrity can be determined via the inequation, $|\tau_{max}| \leq \tau_c \partial$, 'where $\tau_{max}$' is the shearing stress arising in the body of a layer under its own weight, and where '$\tau_{c\partial}$' is the maximum shearing stress that the composition of the material is able to withstand (depending on the viscosity and other parameters of the material).

The shearing stress can be calculated from the formula, $$\tau max = \frac{m\,g\sin(\alpha)}{s},\qquad\text{(Equation 1)}$$

where 's' is a contact area of the layers.

Also known is the following relationship:

$$S = (b - t/tga)l \qquad\text{(Equation 2).}$$

When resolving the value of mass in Equation 1 into a multiplication of (1) the density (e.g., 1600 kg/m³ by default) and (2) the volume of a printed layer, the following final formula of a particular weight shearing stress is derived:

$$\tau max = \frac{15680\,bt\sin(\alpha)}{b - t/tga}. \qquad\text{(Equation 3)}$$

The maximum shearing stress in one embodiment of print material is 156 N/m², which is a value obtained experimentally. With a safety margin of 30%, the maximum shearing stress in the material would be 109.2 N/m².

Based on this value, the most profitable and acceptable parameters for printing may be determined.

Figure 18:
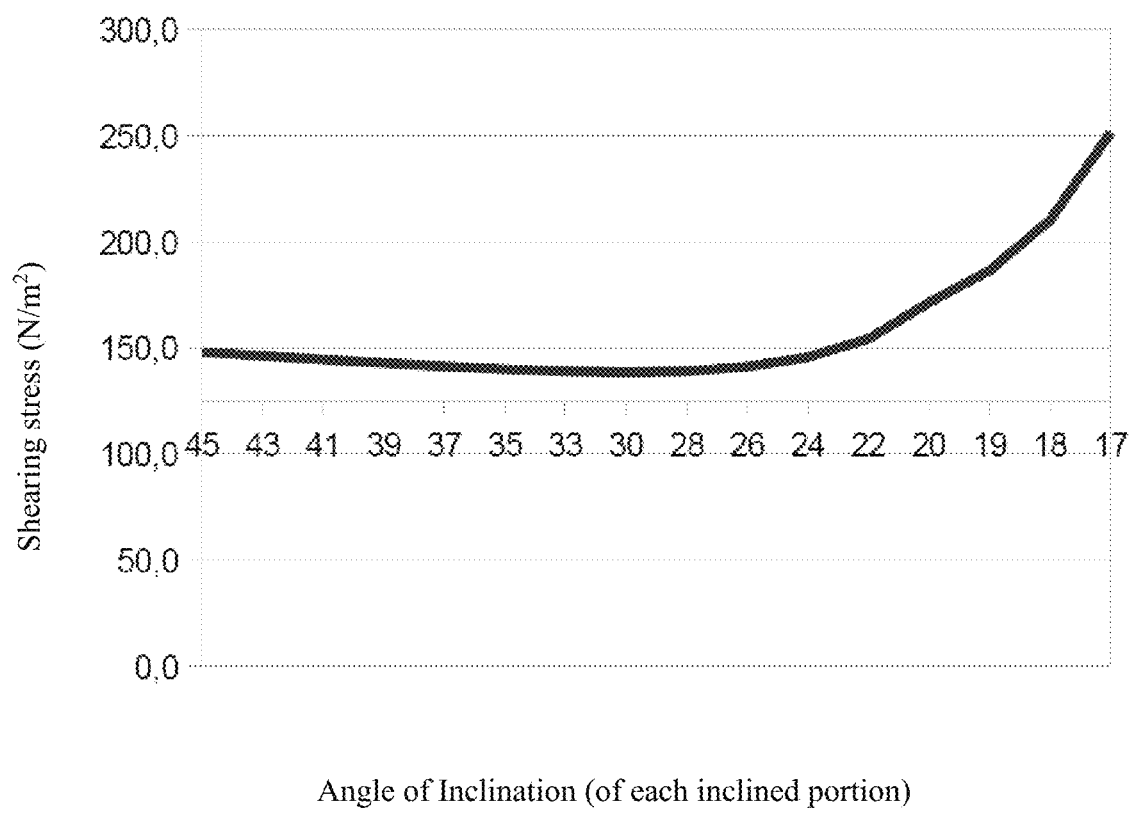
FIG. 18 shows an exemplary graph of shearing stress versus angle of inclination of each inclined portion as it is printed.

All other things being equal, the optimal angle of inclination is an angle of about 30° as seen from FIG. 18.

The optimal print bandwidth, b, is calculated with a printing angle of 30°, for example. The angle preferably is between 30 and 45 degrees. In this range, the angle that is most optimal for producing a horizontal printed layer.

The optimal bandwidth (i.e. length, referred to herein as 'b') of the exemplary layer is 110 mm. With such a print bandwidth, the shearing stress is within acceptable limits. Increasing the width of the printed layer is inexpedient from a technical and economic point of view.

The maximum thickness of the printing layer, t, is calculated as follows. The value of the new layer overlaps the value for the previous layer, z=t/sin α; hence, the speed of printing and therefore overlapping is directly proportional to the potential thickness of a desired layer.

For the example above, the maximum acceptable portion thickness is 11 mm.

The size of the spacing, z=t/sin α, at a thickness (t) of 11 mm and a printing angle (a°) of 30°, is 22 mm. This is the calculated optimal value at this stage of the process in this example, in accordance with the printer's capabilities and the characteristics of the composition of the printing material.

Horizontal structure printing is performed by printing inclined layers forming inclined portions of a larger horizontal structure, such as a roof, floor, or slabs. Each new layer comprises inclined portions which result in a horizontal layer having a thickness between 1 and 50 mm. This total thickness of each new layer depends on the thickness of each inclined portion and the print angle. The invention is realized by making a nozzle having a given angle or alternatively inclining a nozzle at a given degree.

Printing begins after an inclined plane is either placed or printed on a starting wall. The process of the present invention is described in detail as follows:

Overlapping is printed on the erected walls; in order to start printing, an inclined plane is formed, the inclined plane has a triangular cross section and spans the entire length of a width of the desired horizontal structure, the inclined plane being positioned on the starting wall. This allows for printing at a specified angle, wherein the printing is performed to form individual inclined portions. This is exemplified in FIGS. 1-10.

Figure 1:
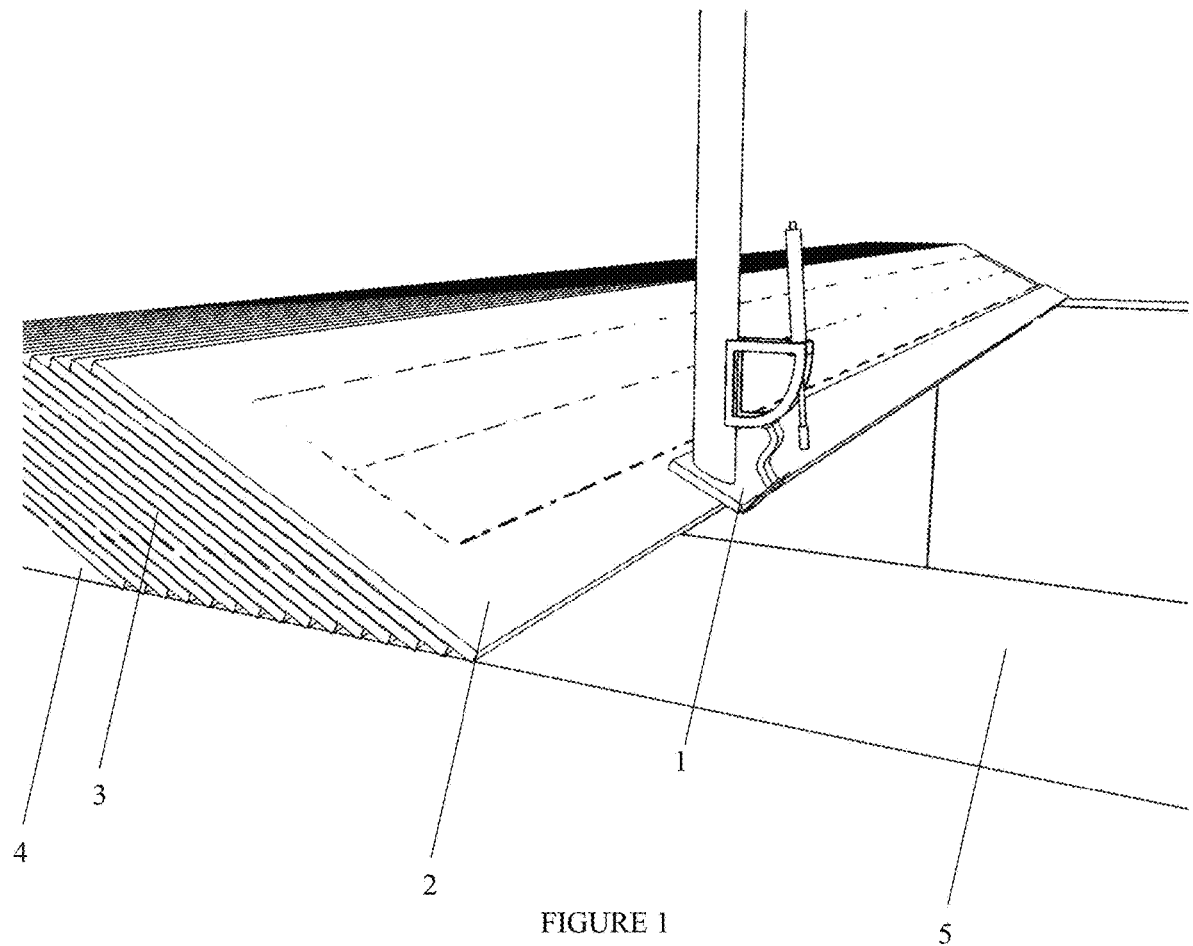
FIG. 1 shows an exemplary embodiment of the present invention where a solid filled slab is printed.

In FIG. 1, a printing robot 1 is shown forming an inclined portion 2, forming slab-like layers 3 which are positioned in an overlapping fashion on top of one another and laterally, in order to form a horizontal structure. The slab-like layers form a bond with each other such that the structure may be built and set. The initial slab-like layer may be printed on a first layer comprising an inclined plane and having a triangular cross-section 4. The first layer 4 is printed or otherwise built onto a permanent structure 5 (e.g., a wall of a building).

Figure 2:
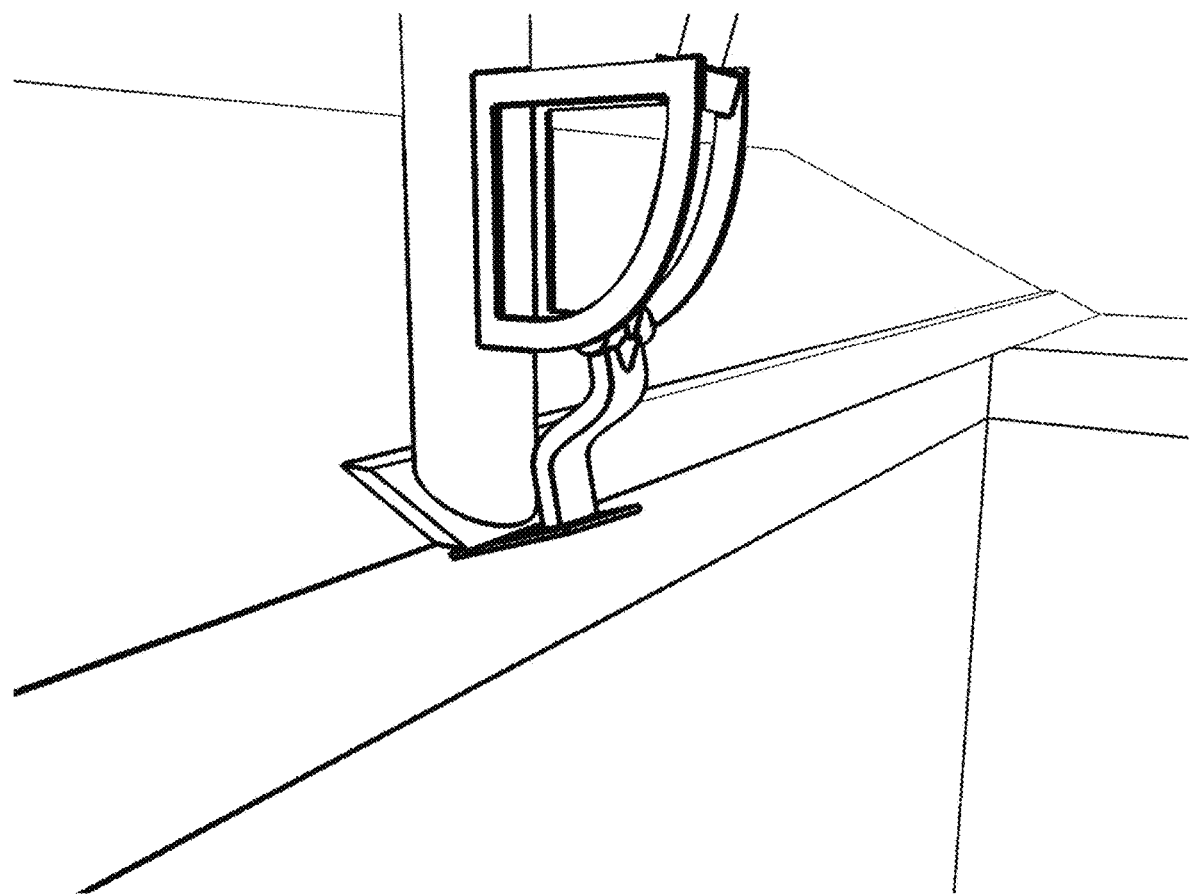
FIG. 2 shows an exemplary embodiment of the present invention where a first type of layer is formed.
Figure 3:
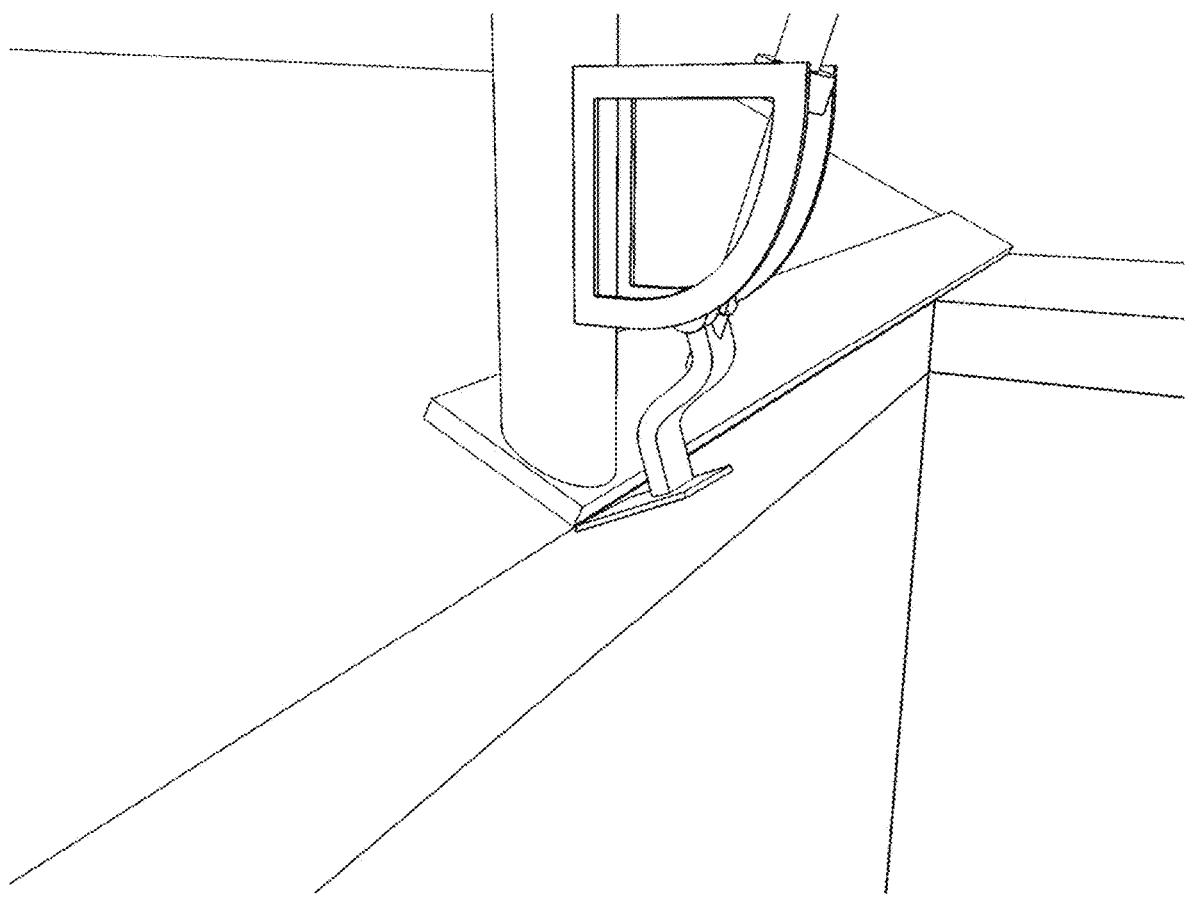
FIG. 3 shows an exemplary embodiment of the present invention where a second type of layer is formed.
Figure 4:
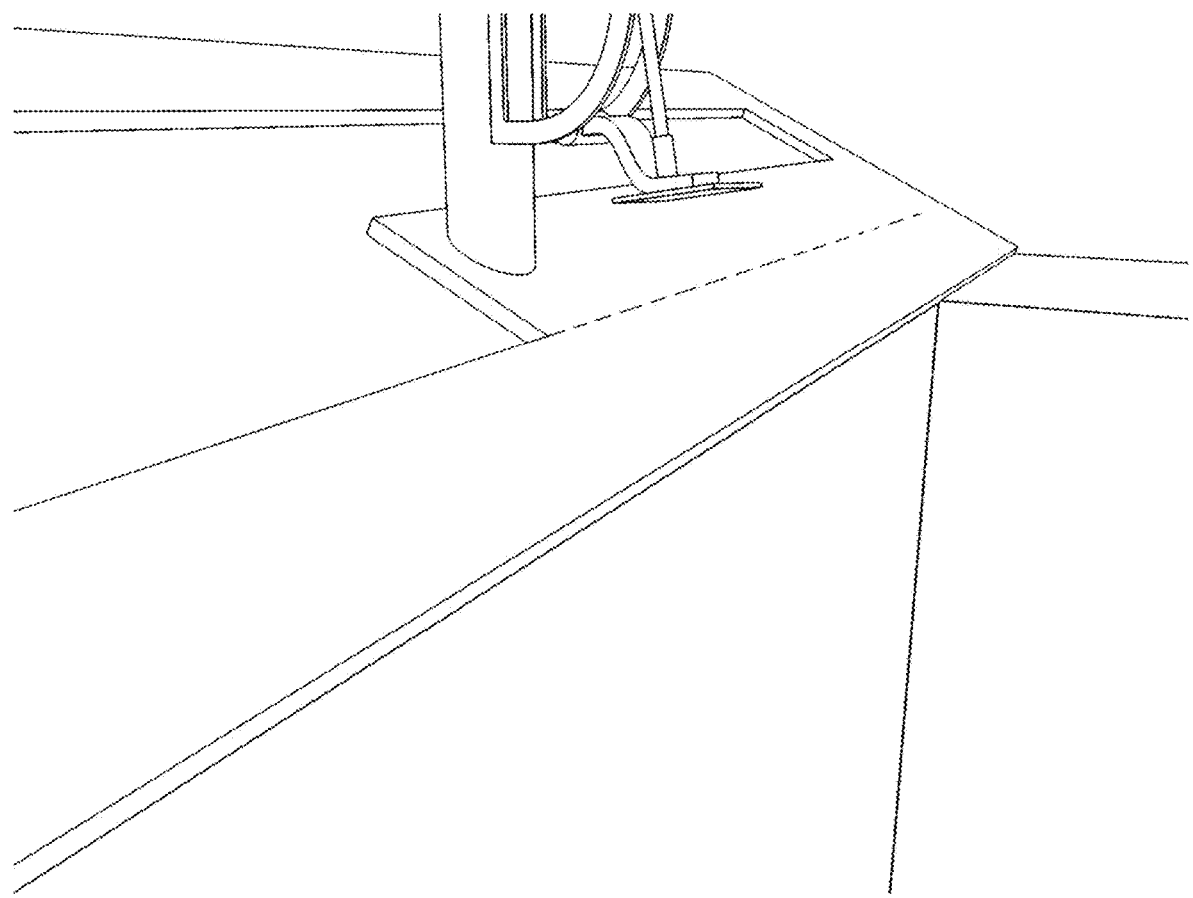
FIG. 4 shows the next step in the process relating to FIG. 3.
Figure 5:
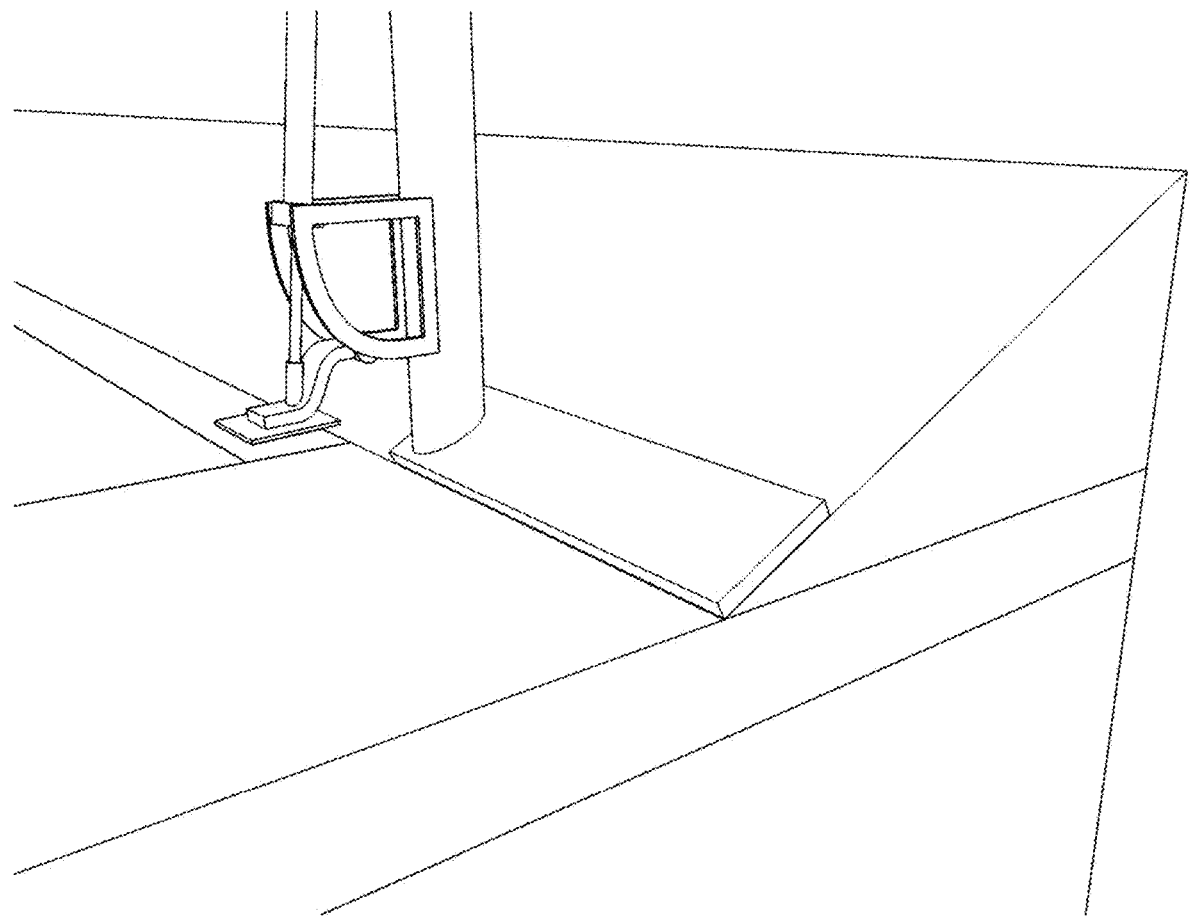
FIG. 5 shows an exemplary embodiment of the present invention where the second type of layer is formed, from a different perspective.
Figure 6:
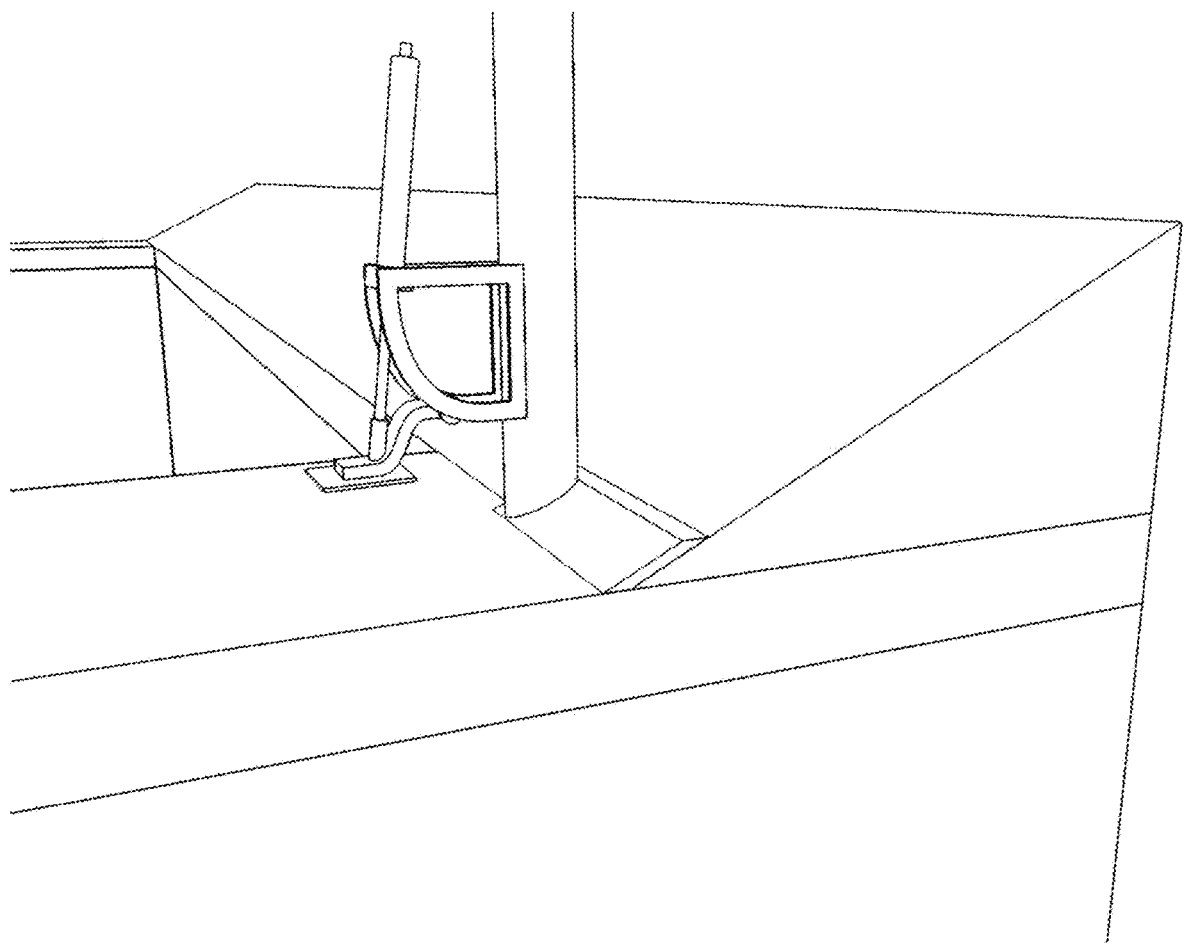
FIG. 6 shows an exemplary embodiment of the present invention where the first type of layer is formed, from a different perspective.
Figure 7:
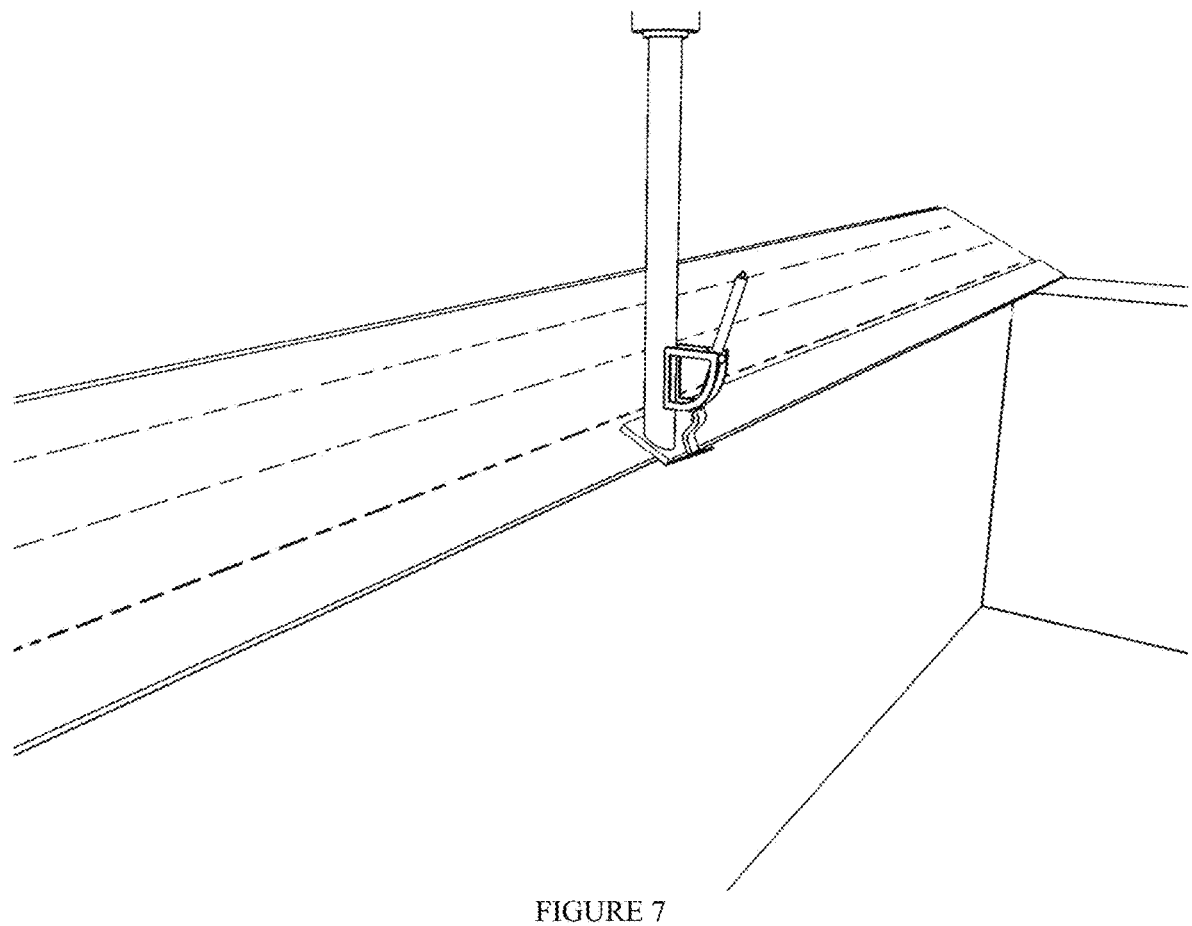
FIG. 7 shows an exemplary embodiment of the present invention where a further layer is formed on top of a completed layer.
Figure 8:
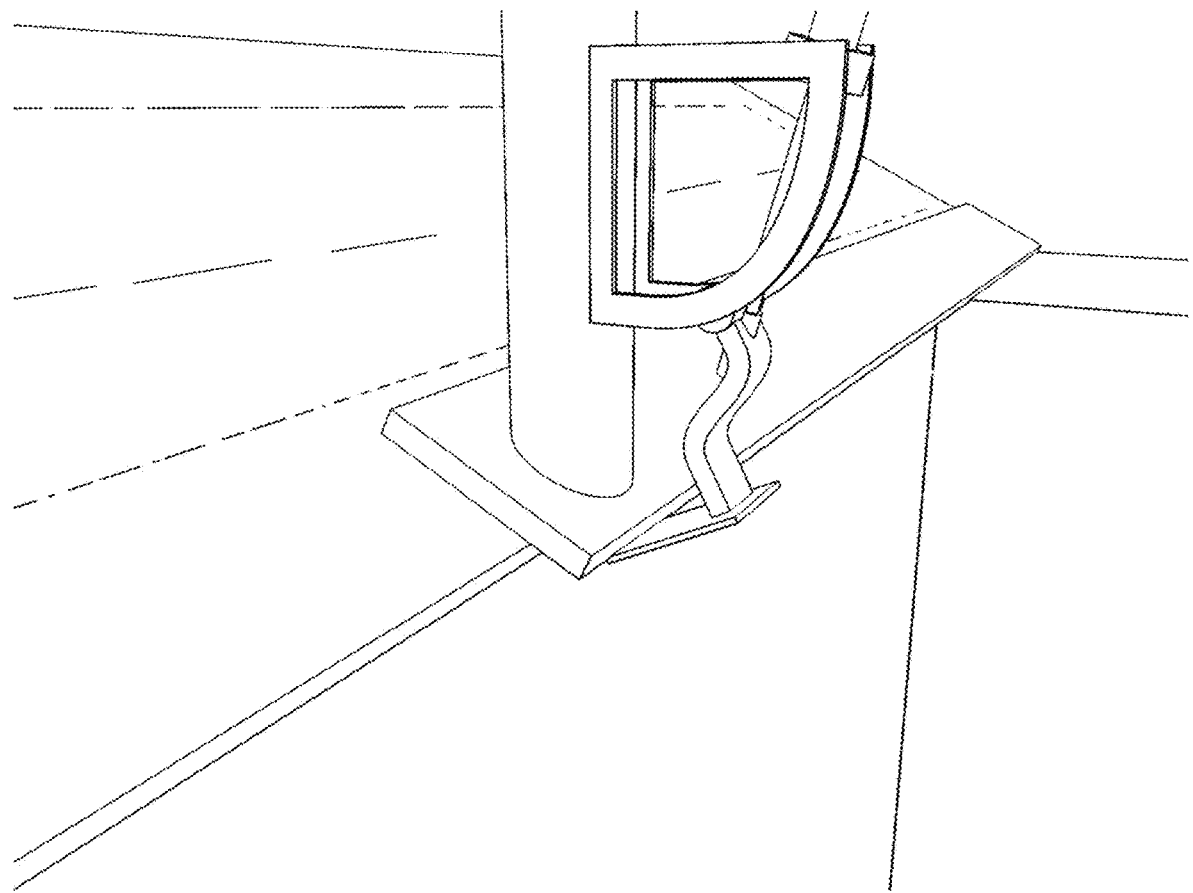
FIG. 8 shows more detail regarding FIG. 7.

The printing robot 1 may first form a boundary of each inclined portion, thereafter filling in the inner portion of each inclined portion. FIGS. 2-3 show exemplary formations of a bottom part of a boundary of an inclined portion. FIG. 2 shows an example where the bottom portion (and therefore each portion) of the inclined portion has angled edges. FIG. 3 shows an example with flat edges. FIG. 4 shows an example where the inner portion of an angled portion is filled by the printing robot.

FIGS. 5-8 show different angles of perspective for the same embodiments described immediately above.

Figure 9:
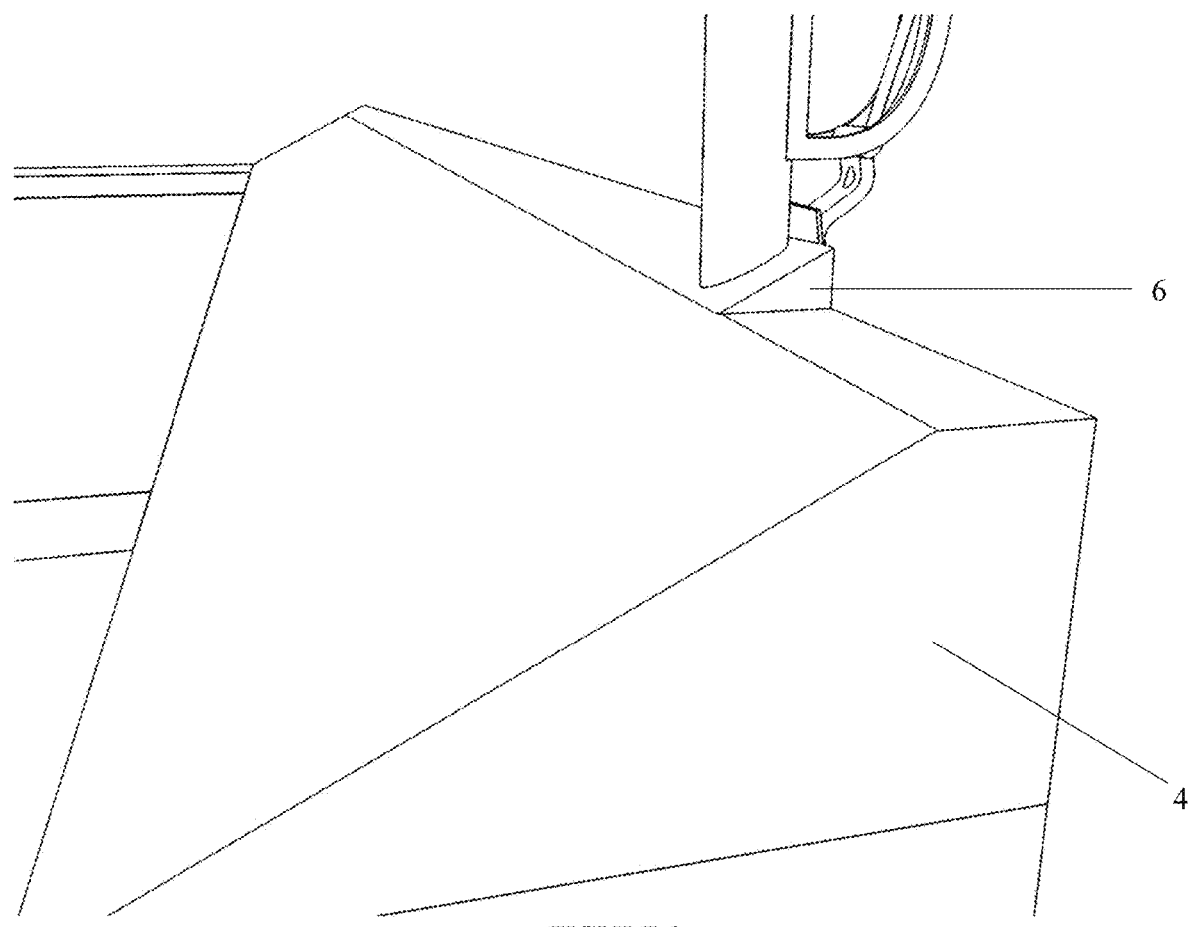
FIG. 9 shows an exemplary embodiment of the present invention where a triangular portion is printed to create flatness or to level a structure.

FIG. 9 shows an embodiment of the present invention where a second triangular-cross sectional piece 6 (i.e. a final portion) is printed above the aforementioned first layer comprising an inclined plane and having a triangular cross-section 4. This may be done, e.g., for flattening (i.e. bringing to perpendicular) of a top of a desired horizontal structure. Such a final portion 6 may be formed either via a precast portion having an inclined surface (wood, iron, etc.) and comprising a solid material, or alternatively, the final portion 6 may be printed via the means for 3D printing (the process comprises printing a first horizontal layer as shown in FIG. 10, followed by the printing of additional final portions as shown in FIG. 9).

Figure 10:
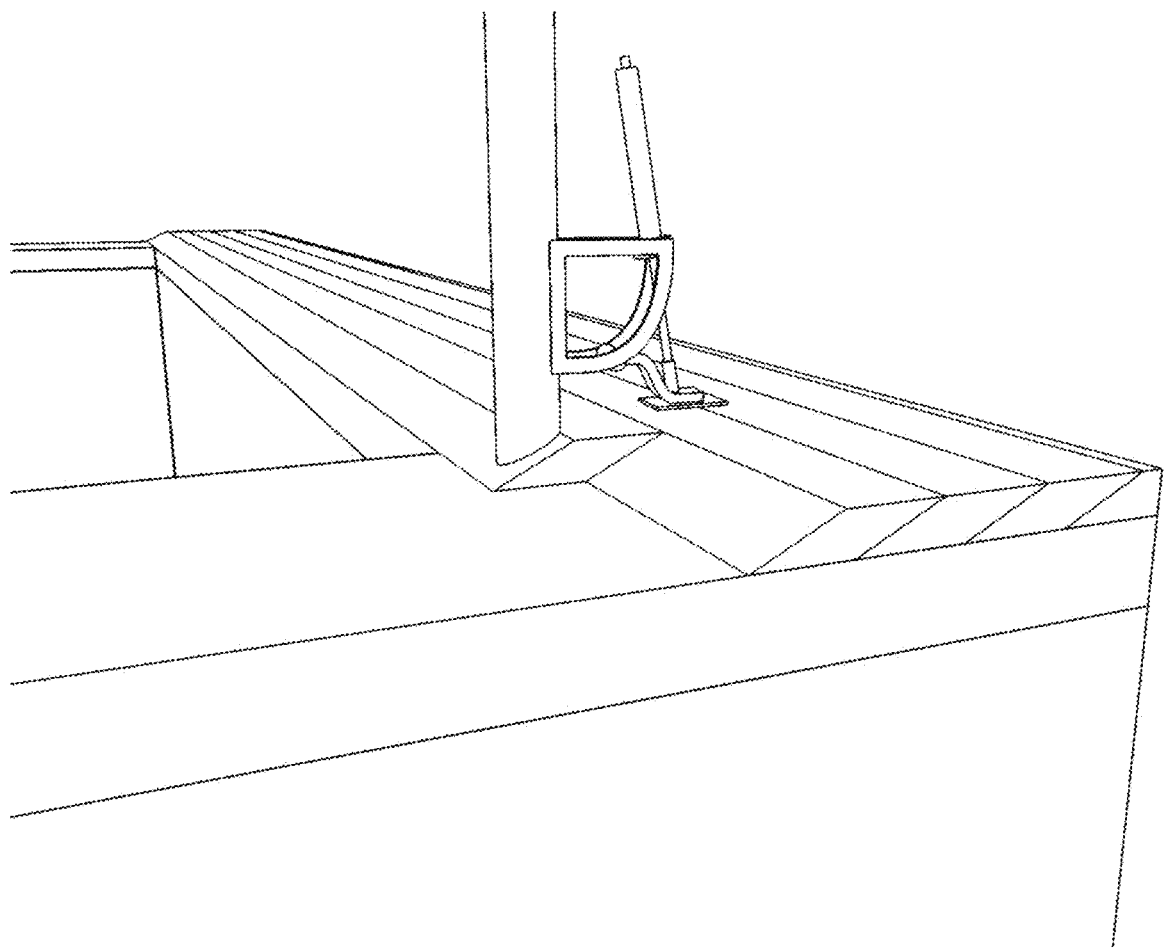
FIG. 10 shows the continuation of the process shown in FIG. 9.
Figure 11:
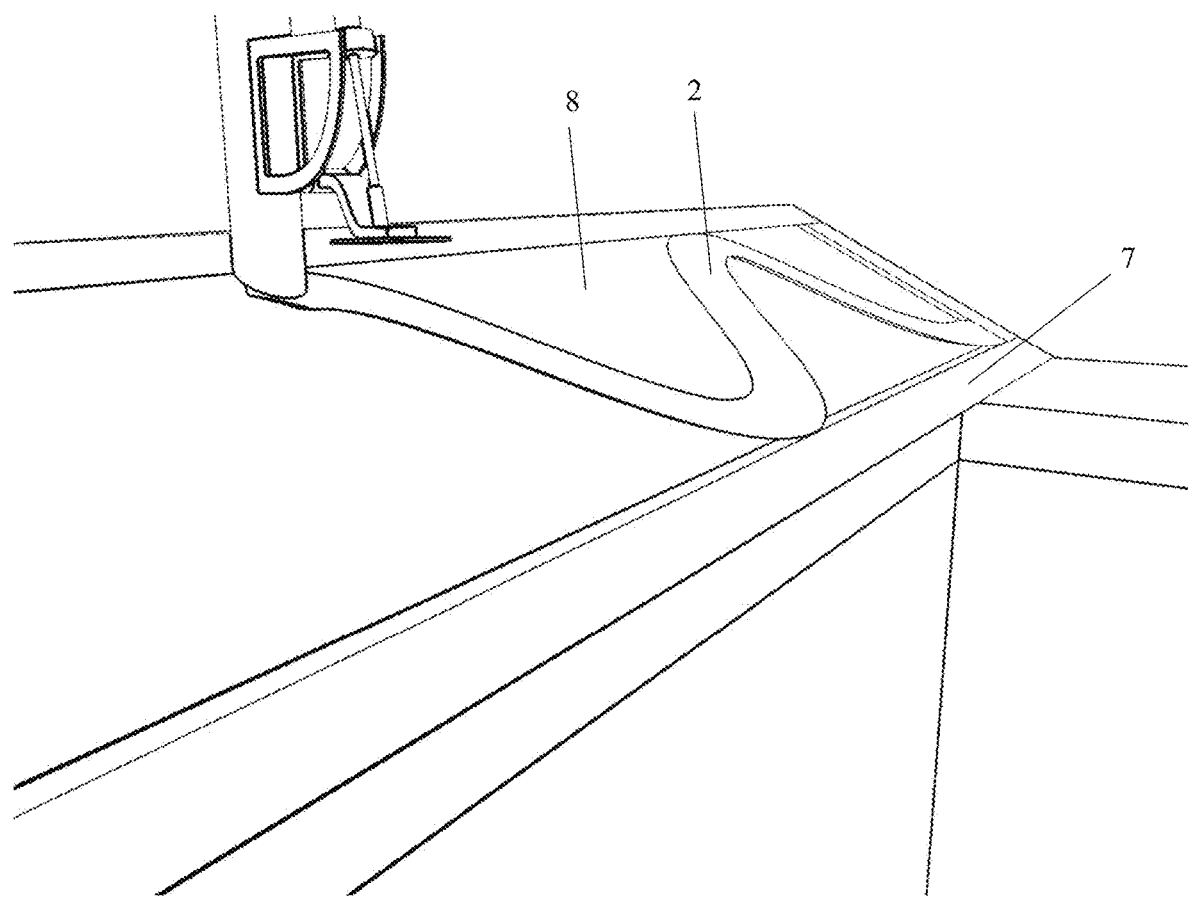
FIG. 11 shows an exemplary embodiment of the present invention where layers are printed with voids in each layer or portion.
Figure 12:
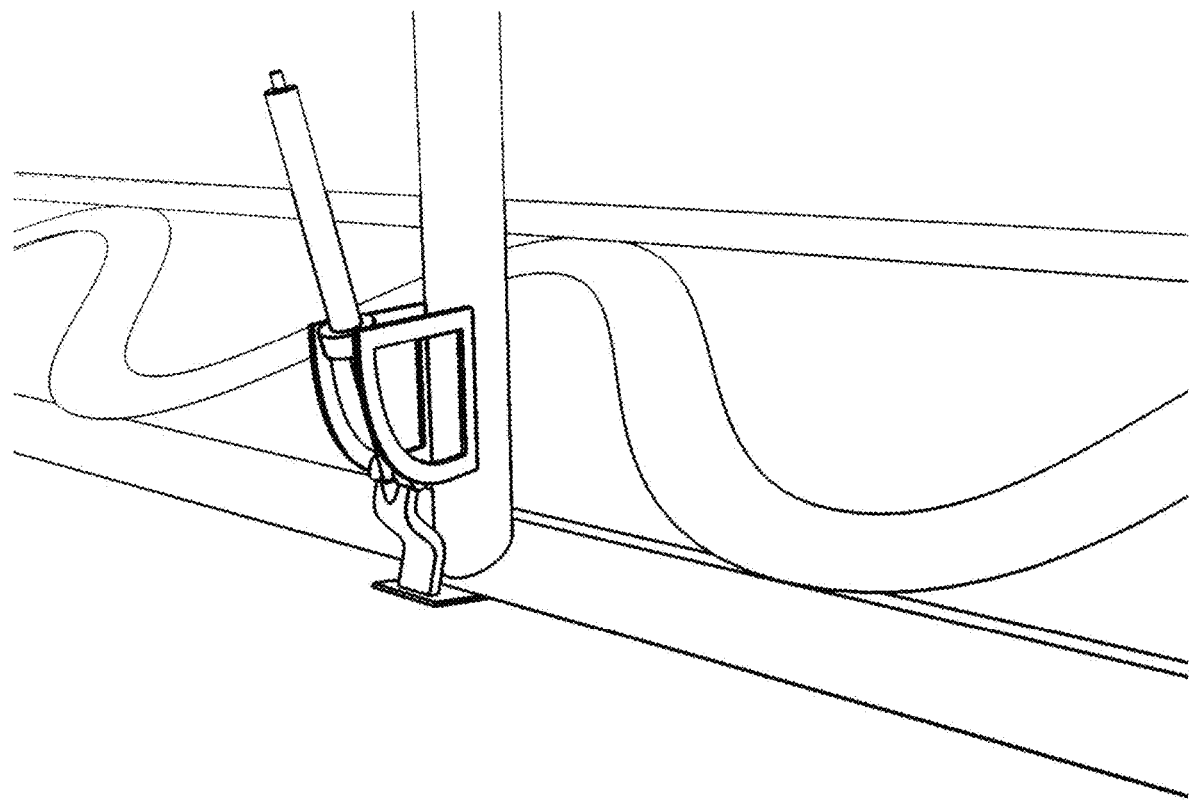
FIG. 12 shows the continuation of the process shown in FIG. 11.
Figure 13:
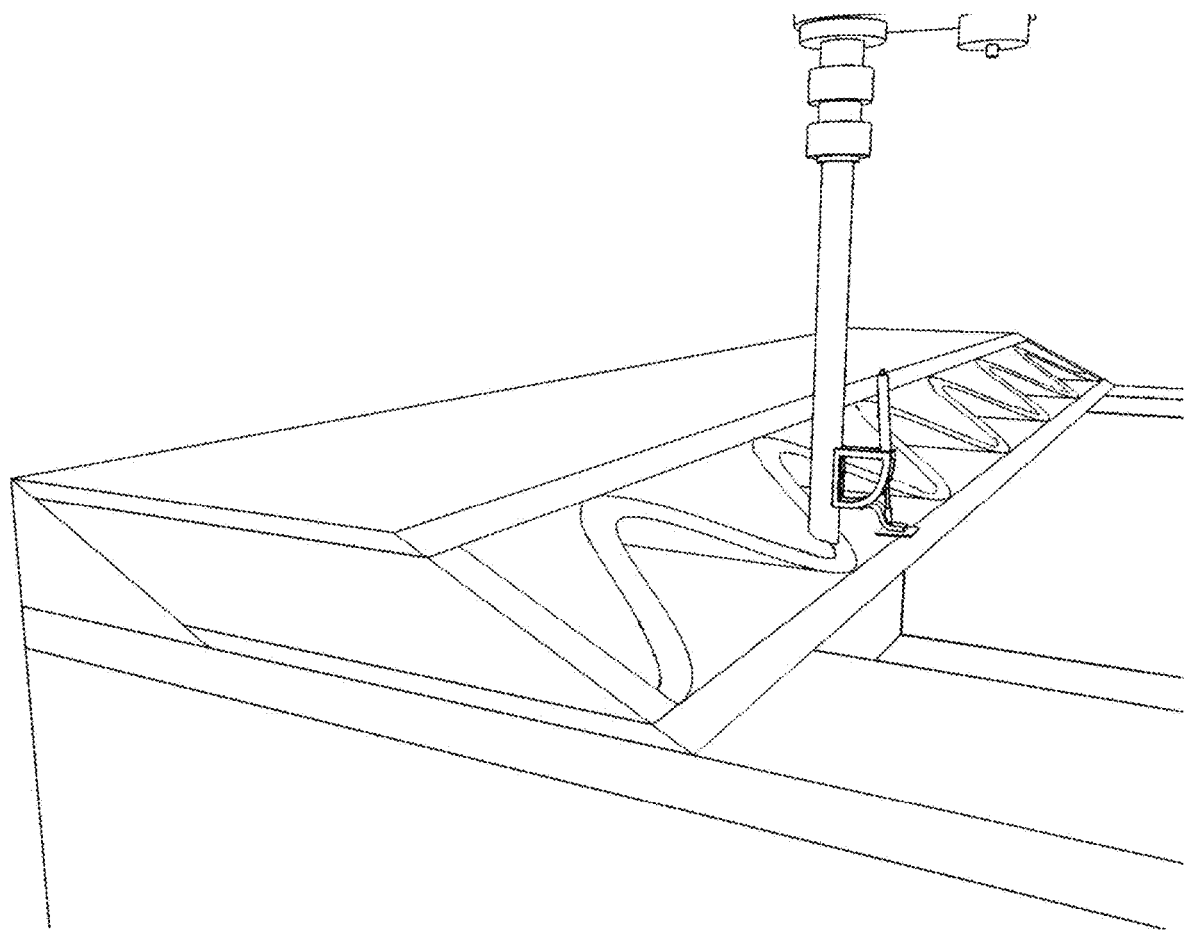
FIG. 13 shows the continuation of the process shown in FIG. 12.
Figure 14:
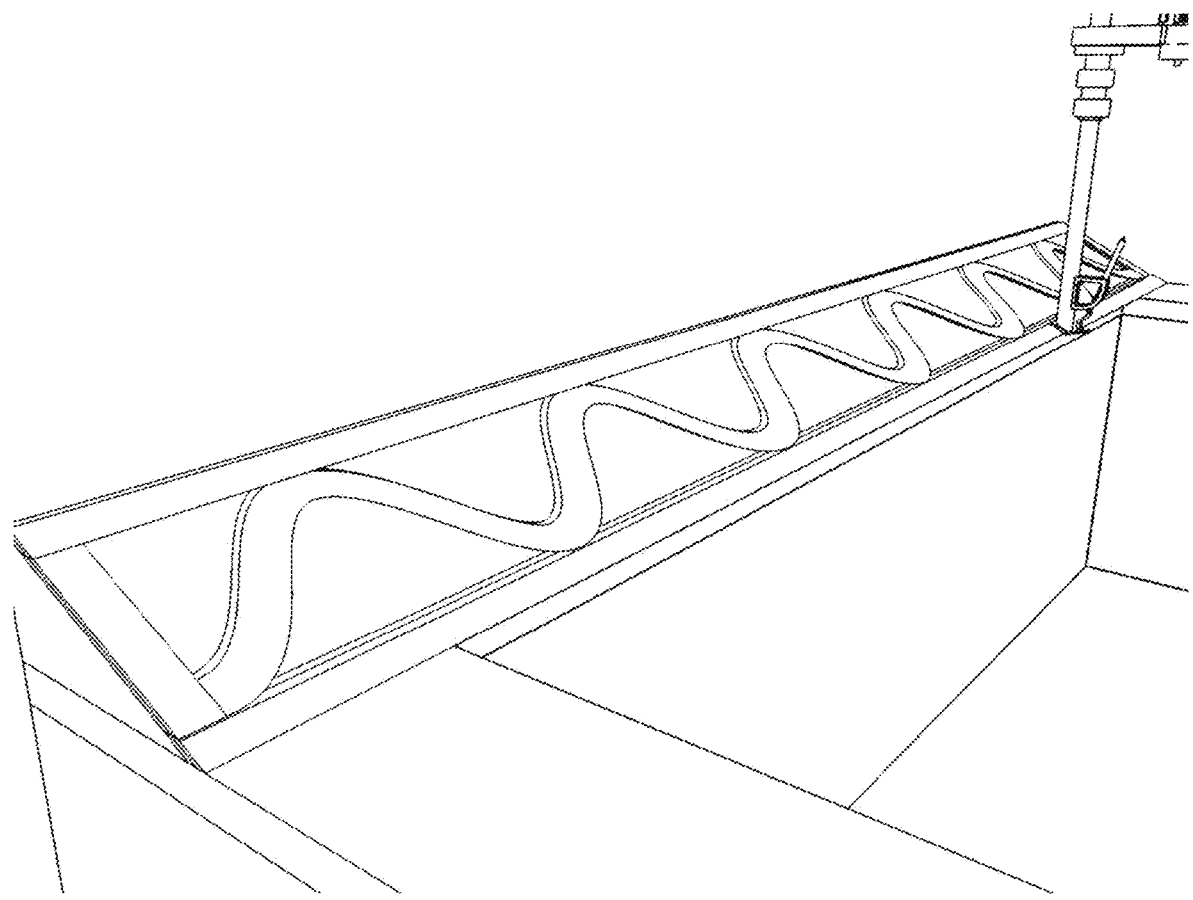
FIG. 14 shows the continuation of the process shown in FIG. 13.
Figure 15:
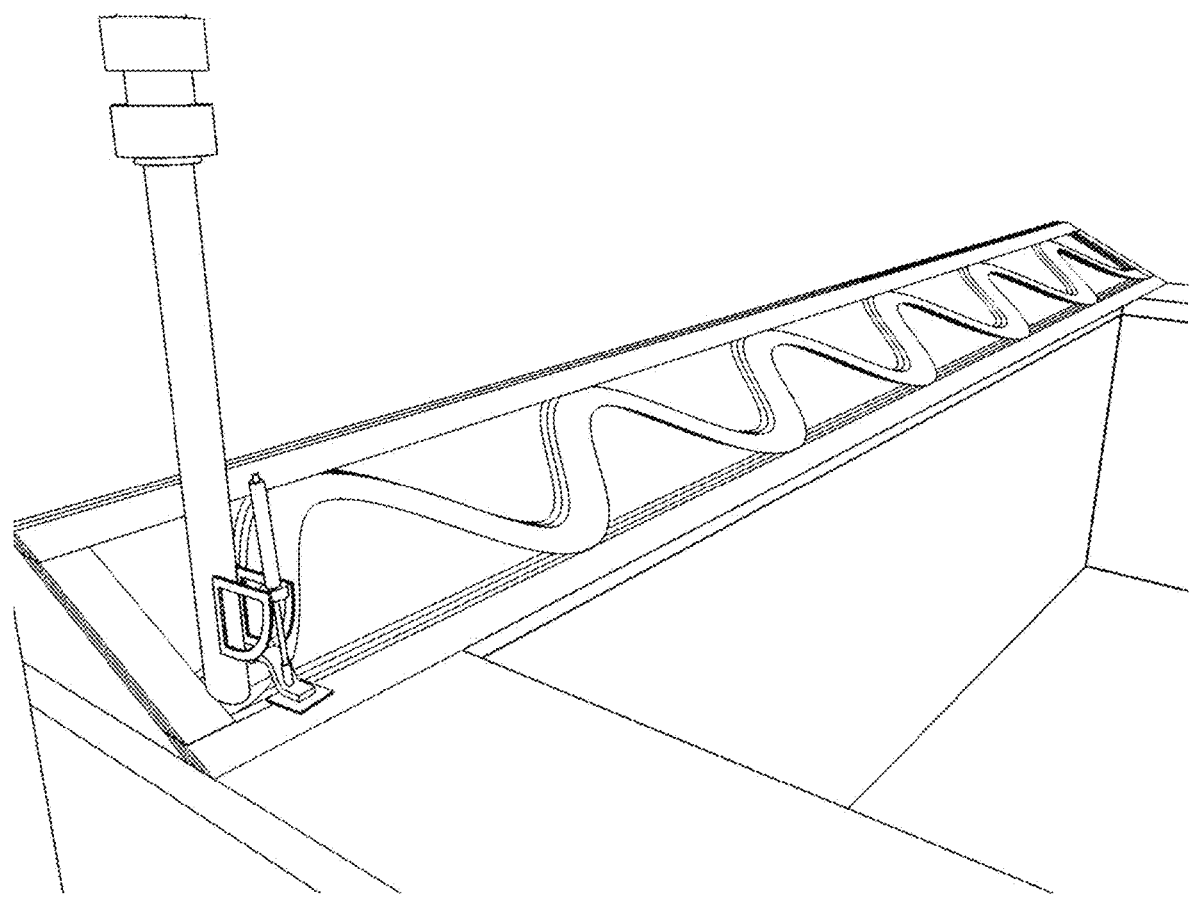
FIG. 15 shows the continuation of the process shown in FIG. 14.

FIG. 10 shows an embodiment of the present invention where each inclined portion is printed to form an array of connected inclined portions which form a horizontal layer which is flat (i.e. perpendicular to the ground, to the structure, or both).

FIGS. 11-15 show embodiments of the present invention where, after an initial boundary 7 of a given inclined portion is printed, the inner portion of each inclined portion is printed with voids 8 (i.e. the layer contains openings after being completed). With each new inclined portion, the voids 8 become larger as the printed portion of each layer binds to the next. As shown, the voids 8 may be formed by the printing of individual inclined portion sections which are wave-shaped. When combined together, the wave-shaped sections bind to each other and form voids adjacent to the printed material and contained within the boundary section which is printed.

Figure 16:
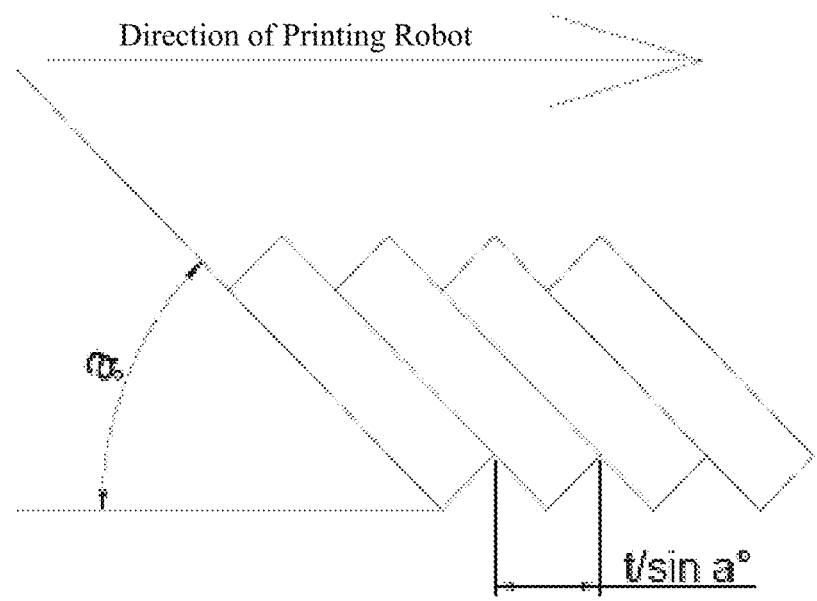
FIG. 16 shows a cross sectional view of inclined portions as they are printed to be layered in a direction of the printing robot's eventual movement (i.e. to the right of this figure). It is noted that the printing robot should be capable of motion in all three axis.

FIG. 16 shows a cross sectional view of printed inclined portions which begin to form a horizontal layer of a desired structure. Angle 'a' is shown as the angle of inclination of each printed portion. The correlation to the value 't/sin(a)' is also shown in FIG. 16. The direction of the printing robot is labelled to show that each inclined portion is printed with an overlap on the immediately previous inclined portion. Therefore, a horizontal layer may be formed. More than one horizontal layers comprising varying types of printed inclined portions may form the desired final horizontal structure.

Figure 17:
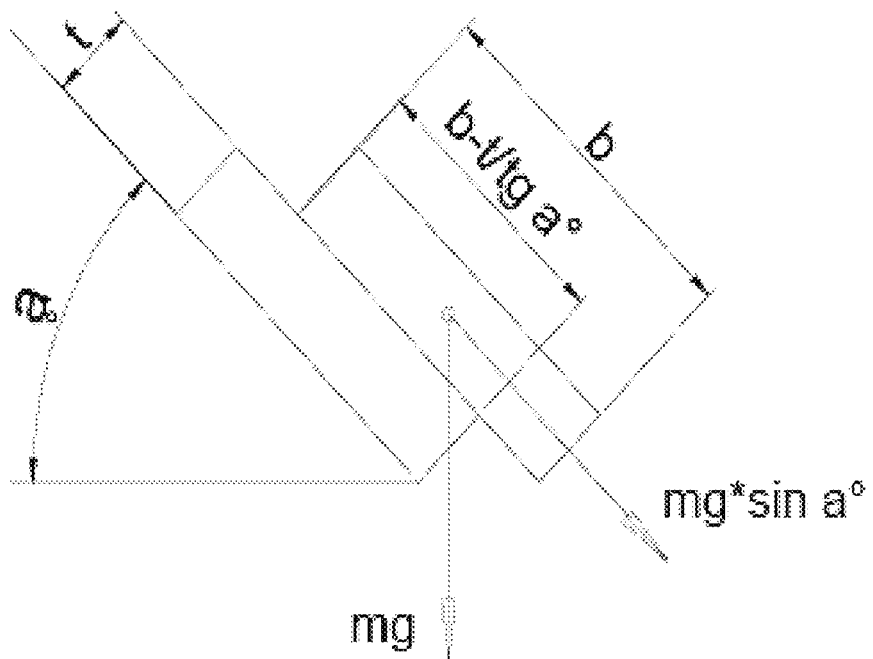
FIG. 17 shows the same view as FIG. 16 but with additional terms and relationships found in the description below.

FIG. 17 further provides the correlations of the values '(b-t)/t*g*a', 'mg*sin(a)', and 'mg', taken from the Equations (1-3) discussed above, based on the angle of inclination (a), the width of each printed inclined portion (b), gravity (g), and the mass of each inclined portion (m).

Figure 19:
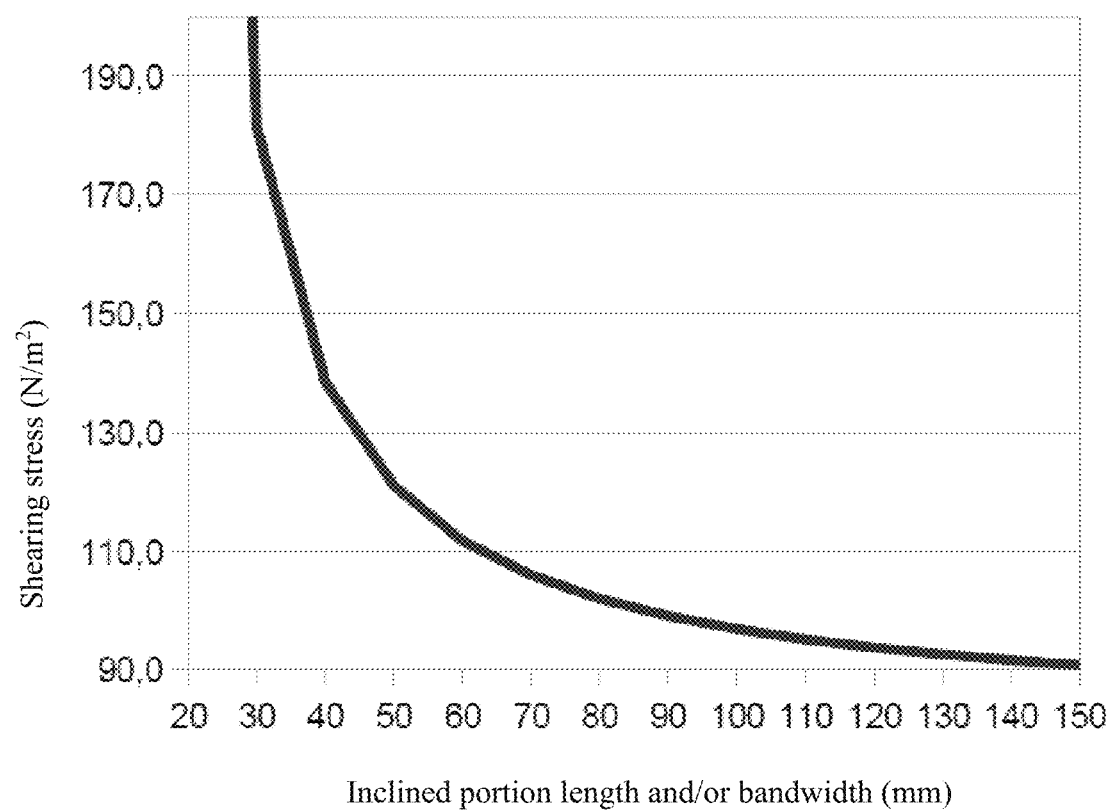
FIG. 19 shows an exemplary graph of shearing stress versus inclined portion length and/or bandwidth.
Figure 20:
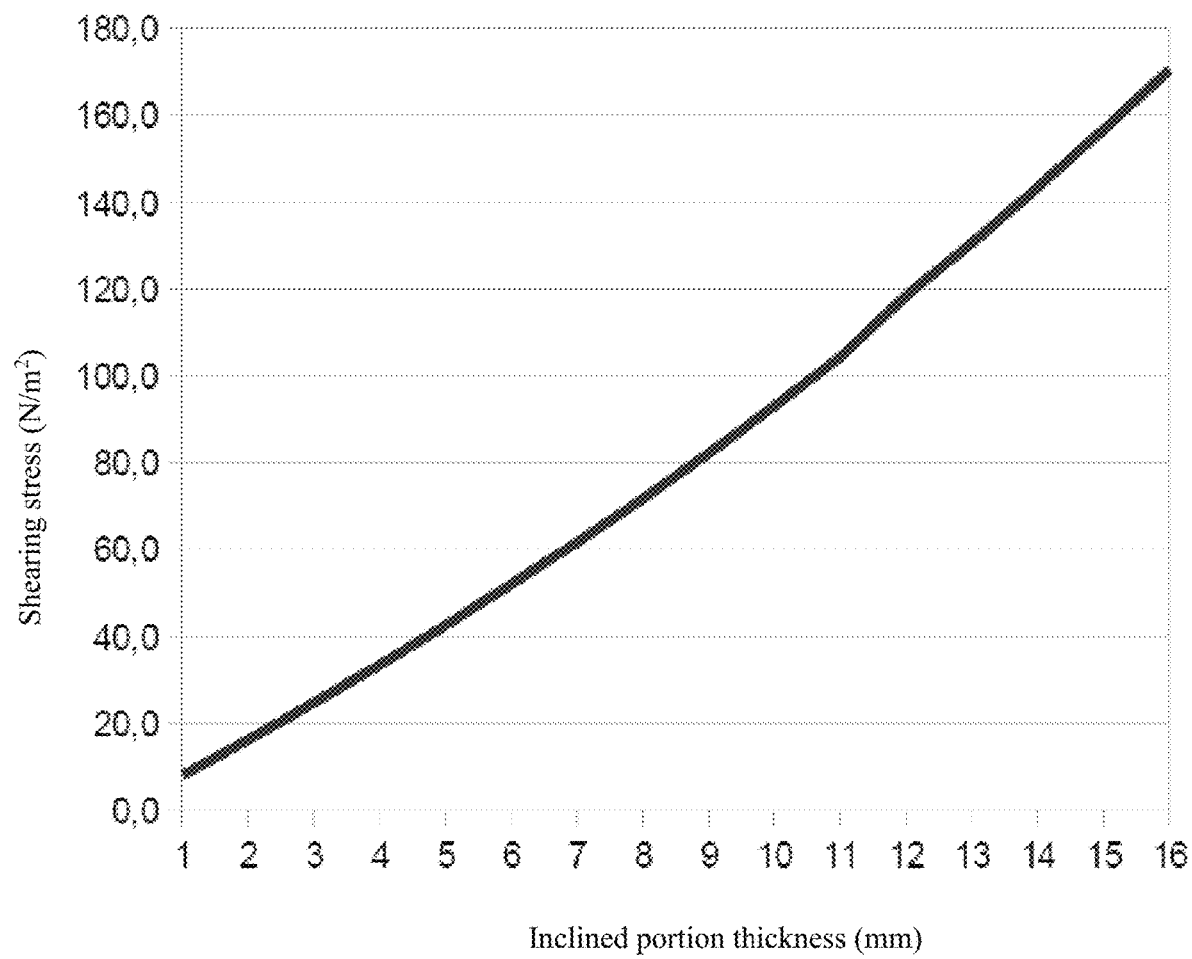
FIG. 20 shows an exemplary graph of shearing stress versus inclined portion thickness.

FIGS. 18-20 show graphs which illustrate the relationships between shearing stress of the printed material and (1) the angle of inclination of each inclined portion (FIG. 18), (2) the inclined portion bandwidth (length) (FIG. 19), and (3) the inclined portion thickness.

The resistance of each inclined portion of each printed inclined portion to sliding down is provided by rheological properties of the printing solution and the solution's setting time.

In order to increase the bearing capacity, it is possible to insert a reinforcing thread in one or more printed layers or one or more inclined portions.

It is important to use a thixotropic material with fast setting times, and it is important to note that the characteristics are also selected based on the printer parameters (e.g., print speed, layer height, layer width) as well as overlap parameters (e.g., span, height, etc.) of the inclined portions and the entire horizontal structure as a whole.

Each inclined portion may be printed by any means for 3D printing, but using a particular velocity or trajectory. Any means for printing may be used if the right printing angle is applied, and also if viscosity and setting time of the material is proper when calculated via the disclosed above equations.

As a general rule, the setting time of the printing material should be less than the time it takes to print one portion of each layer. If setting time is longer than the time to print an inclined portion, the first printed portion will not comprise sufficient strength properties to hold the next printed portion. It should be noted that each inclined portion may comprise more than one section which can be printed individually, but preferably, each inclined portion comprises a single piece of material when set, such that all individual sections (if any), are bound together as well.

Possible nozzle designs include the following:

1. A nozzle as a tube installed into a printing robot wherein the tube's end is cut at a certain angle (i.e. beveled edge of nozzle);

2. The whole extruder (i.e. 3D printing robot) is tilted at a certain angle;

3. Combinations thereof.

Viscosity range for the preferred mixture/solution:
Helipath viscosity: 700-1200 pascal/sec;
From 470 pounds per foot-second [lb/(ft·s)] to 860 pounds per foot-second [lb/(ft·s)].

In general, required viscosity may be calculated as follows:

T=L/V, where V is the average speed of an extruder's (i.e. means for 3D printing) movement, where L is the total length of all sections required to form one inclined portion. As a limit, the value 'L/V' cannot be greater than 1.3 T.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for printing a horizontal structure, comprising,
providing a means for 3D printing and a printing material,
forming via said means for 3D printing an array of inclined portions using said printing material,
said inclined portions being positioned in an overlapping manner, wherein one inclined portion is printed above an immediately preceding completed inclined portion,
said inclined portions binding to each other and setting,
said inclined portions being printed at an angle of between 30 and 45 degrees relative to a ground reference, wherein a boundary section of each inclined portion is printed, and wherein an inner area of each inclined portion is printed thereafter.

2. The method of claim 1, wherein an initial portion is provided prior to printing of any inclined portion, said initial portion comprising an inclined plane, said initial portion having a triangular cross-section.

3. The method of claim 2, wherein said initial portion is printed via said means for 3D printing.

4. The method of claim 1, wherein an additional final portion is printed atop the horizontal structure formed by said means for 3D printing, said additional final portion comprising an inclined plane, said additional final portion having a triangular cross-section.

5. The method of claim 1, wherein said inner area comprises one or more voids.

6. The method of claim 1, wherein said inner area comprises material in a wave shape.

7. The method of claim 6, wherein one or more voids are adjacent to said material in a wave shape.

8. The method of claim 7, wherein said one or more voids are within said boundary section.

9. The method of claim 1, wherein an angle of inclination of each inclined portion is determined via the relationship, $$\tau \max = \frac{15680 bt \sin(\alpha)}{b - t/tg\alpha}.$$

10. The method of claim 1, wherein a setting time of the printing material is less than a printing time for each section of each inclined portion.

11. The method of claim 1, wherein a setting time of the printing material is less than a printing time for each inclined portion.

12. The method of claim 1, wherein the means for 3D printing comprises a beveled edge nozzle.

13. The method of claim 1, wherein the means for 3D printing comprises a flush edge nozzle, wherein the flush edge nozzle is positioned at an angle relative to a ground reference.

14. The method of claim 1, wherein the printing material has a helipath viscosity between 700 and 1200 Pascal/second.

15. The method of claim 1, wherein a flat horizontal layer is printed below the horizontal structure, and wherein inclined portions are thereafter printed atop said flat horizontal layer.

16. The method of claim 15, further comprising a printing of a first portion atop said flat horizontal layer prior to any printing of said inclined portions.

17. The method of claim 1, wherein a combination of inclined portions forms a layer having a flush surface.

18. The method of claim 1, wherein a combination of inclined portions forms a layer having a jagged surface.

19. The method of claim 1, wherein each inclined portion comprises two or more sections, each section being printed sequentially.

\* \* \* \* \*